2 Sheets--Sheet 1.

W. E. HAXTUN.

Furnace.

No. 6,503. Reissued June 22, 1875.

WITNESSES:

E. A. West

C. W. Bond

INVENTOR.

W. E. Haxtun

THE GRAPHIC CO. PHOTO-LITH. 39 & 41 PARK PLACE, N.Y.

2 Sheets--Sheet 2.

W. E. HAXTUN.

Furnace.

No. 6,503. Reissued June 22, 1875.

WITNESSES:
E. A. West
C. W. Bond.

INVENTOR:
W. E. Haxtun

THE GRAPHIC CO. PHOTO-LITH. 39 & 41 PARK PLACE, N.Y.

UNITED STATES PATENT OFFICE.

WILLIAM E. HAXTUN, OF KEWANEE, ILLINOIS.

IMPROVEMENT IN FURNACES.

Specification forming part of Letters Patent No. 159,178, dated January 26, 1875; reissue No. 6,503, dated June 22, 1875; application filed April 17, 1875.

*To all whom it may concern:*

Be it known that I, WILLIAM E. HAXTUN, of Kewanee, in the county of Henry and State of Illinois, have invented certain new and useful Improvements in Steam-Generators; and I do hereby declare that the following is a full, clear, and exact description thereof that will enable others skilled in the art to which it appertains to make and use the same, reference being had to the accompanying drawings, and to the letters of reference marked thereon, which form a part of this specification.

Figure 1:
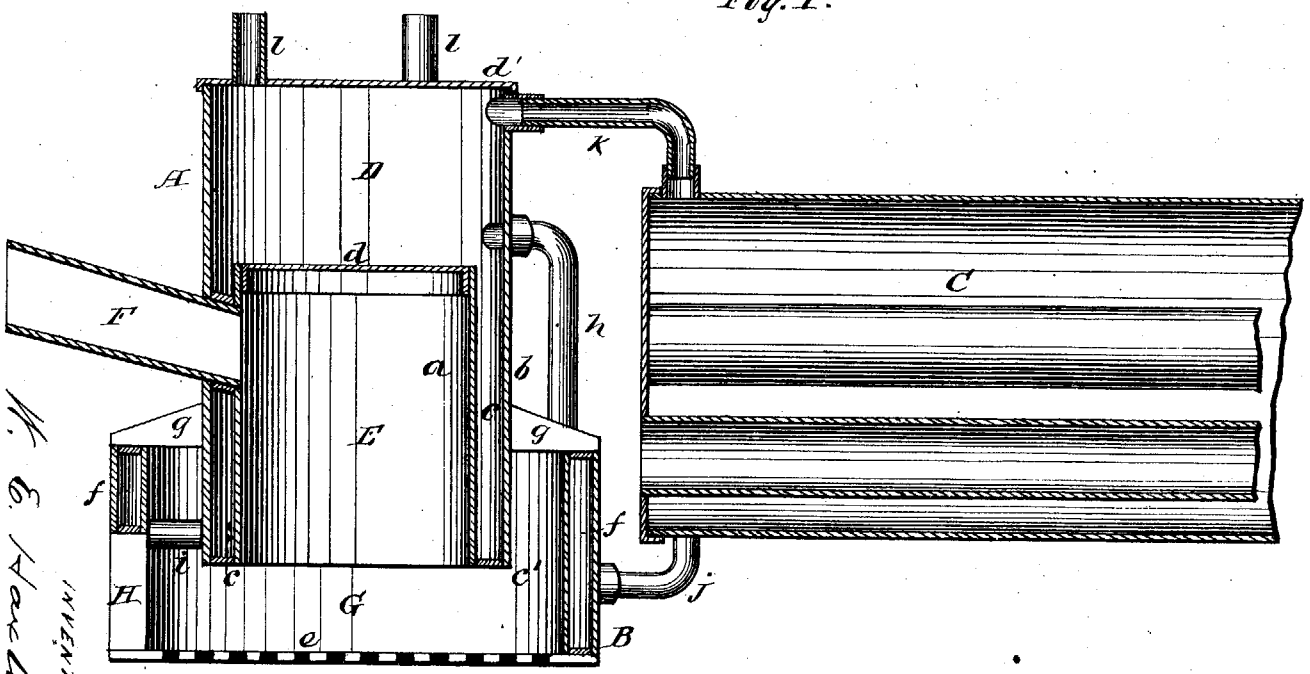
Figure 2:
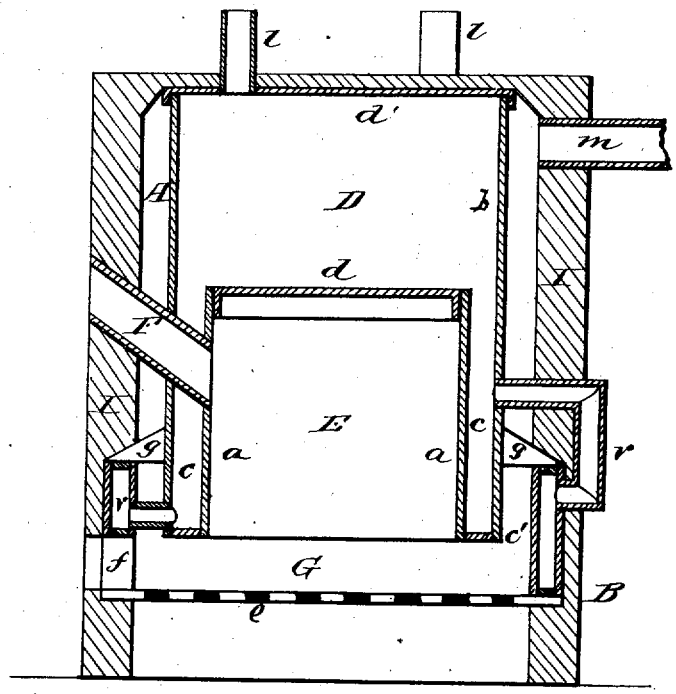

Figure 1 is a vertical section of my invention. Fig. 2 is a vertical section, showing the upright boiler and the water-jacket forming the fire-pot, as used together.

My invention relates chiefly to base-burning steam-generators; and it consists in an improvement upon patent granted to me, No. 153,486, as will be hereinafter more fully set forth, and pointed out by the claims.

In the drawings, A represents a single upright boiler. The lower part has double walls *a b*, forming a water-space, *c*, between them. Each wall or sheet *a b* has a head, *d d'*, riveted to it, the greater part of the space between the two heads being a steam-chamber, D. Within the sheet or wall *a* is the magazine E, for fuel, which is introduced through the chute F. B is a water-jacket or lining, having double walls, but no heads proper, the walls being secured to a ring at the top and bottom, forming a water-space between the walls, marked *f*. When this part B is used with A it forms both a fire-pot or chamber and boiler, G being the fire-chamber. This part B has a door, H, to give access to the fire. As shown, B rests on the grate; but in use I provide a ring, on which both B and the grate *e* are supported, the grate being within B, so that it can be replaced when necessary. The boiler A is supported on B by means of lugs or supports *g*, secured to the boiler A. A and B are connected together by a suitable number of tubes, so that there shall be a free circulation from one to the other. Two such tubes, *h i*, are shown. An ash-pit is to be provided. C is a horizontal boiler, of any desired form. One or more pipes, *j*, form a water communication between B and C. *k* forms a steam communication between A and C. *l l* are steam-pipes, with which heating-coils can be connected. In use it will be well to keep the head *d* covered with water. All of these parts A B C are to be set and incased in brick-work in the usual manner, and so that the smoke and heat will pass from the chamber G up around A in the space *c'*, and then under the boiler C, and back through the tubes to a chimney; or first through the tubes of the boiler C, if preferred. This is the most complete form of my improvements, and is adapted to those cases where a large amount of steam is required.

Fig. 2 shows the same boiler A combined with the water-jacket B, before described, incased in brick-work, but without the horizontal boiler. The part B is suitably supported, as before; the two parts A B are connected by tubes *v*; A rests upon B, and the fire is within B. B serves the double purpose of a boiler and fire-chamber.

In Sheet 1 I have shown all the parts of my invention combined to be used together.

It is evident that the upright boiler A and the horizontal boiler C can be used together, omitting the water-jacket B. I recommend this form only when a large fire box and grate are desired.

My improvements can be used either for heating purposes or for generating steam for mechanical uses.

In the form shown in Fig. 2 there is a space, *c'*, between the two boilers A and B for the passage of smoke, the same as in Fig. 1. The size of this space can be varied as circumstances may require.

What I claim as new, and desire to secure by Letters Patent, is as follows:

1. The boiler A, fire-box E, chute F, and lugs or supports *g*, in combination with the boiler B forming the space *c'*, for the passage of heat and smoke, and furnishing a support for the boiler A, substantially as and for the purposes specified.

2. The combination of the single upright boiler A, water-jacket or boiler B, and horizontal boiler C, the upper boiler connected to horizontal boiler C with suitable pipes, all constructed and operating substantially as and for the purposes specified.

W. E. HAXTUN.

Witnesses:
E. A. WEST,
O. W. BOND.